(12) United States Patent
Xie

(10) Patent No.: US 10,317,604 B2
(45) Date of Patent: Jun. 11, 2019

(54) LED LIGHTBAR AND BACKLIGHT UNIT

(71) Applicant: Wuhan China Star Optoelectronics Technology Co., Ltd., Wuhan, Hubei (CN)

(72) Inventor: Chen Xie, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 200 days.

(21) Appl. No.: 15/534,641

(22) PCT Filed: May 25, 2017

(86) PCT No.: PCT/CN2017/086009
§ 371 (c)(1),
(2) Date: Jun. 9, 2017

(87) PCT Pub. No.: WO2018/201538
PCT Pub. Date: Nov. 8, 2018

(65) Prior Publication Data
US 2019/0086600 A1   Mar. 21, 2019

(51) Int. Cl.
*F21V 8/00* (2006.01)
*G02F 1/1333* (2006.01)
*G02F 1/1335* (2006.01)

(52) U.S. Cl.
CPC ......... *G02B 6/0013* (2013.01); *G02B 6/0016* (2013.01); *G02B 6/0023* (2013.01);
(Continued)

(58) Field of Classification Search
CPC .. G02B 6/0013; G02B 6/0023; G02B 6/0016; G02F 1/133308; G02F 2001/133317; G02F 1/133615
See application file for complete search history.

(56) References Cited

U.S. PATENT DOCUMENTS

2013/0329456 A1* 12/2013 Huang ................. G02B 6/0023
  362/608
2014/0002771 A1*  1/2014 Huang .............. G02F 1/133615
  349/64
(Continued)

FOREIGN PATENT DOCUMENTS

CN     202546445 U  * 11/2012
CN     202546445 U    12/2012
(Continued)

*Primary Examiner* — Jia X Pan
(74) *Attorney, Agent, or Firm* — Andrew C. Cheng

(57) ABSTRACT

A light-emitting diode (LED) lightbar includes a flexible print circuit, a plurality of LEDs arranged on the flexible print circuit, and a light guiding film arranged on the flexible print circuit. The light guiding film is arranged on two adjacent LEDs. The light guiding film includes an incident surface and an emitting surface. Two sides of the incident surface of the light guiding film are attached to emitting surfaces of the two adjacent LEDs. Compared with the related art, a light guiding film is arranged on emitting surfaces of any two neighboring LEDs in the present disclosure. Light beams emitted by the LEDs enter the light guiding film partially. The light guiding film reflects the partial light beams are transferred to the gap between the LEDs. Therefore, the hotspot phenomenon is well curbed.

10 Claims, 1 Drawing Sheet

(52) U.S. Cl.
CPC .. *G02F 1/133308* (2013.01); *G02F 1/133615* (2013.01); *G02F 2001/133317* (2013.01)

(56) References Cited

U.S. PATENT DOCUMENTS

| | | | |
|---|---|---|---|
| 2015/0260897 A1* | 9/2015 | He | G02B 6/0016 362/612 |
| 2017/0082789 A1* | 3/2017 | Yasunaga | G02F 1/1336 |

FOREIGN PATENT DOCUMENTS

| | | |
|---|---|---|
| CN | 102980099 A | 3/2013 |
| CN | 102980102 A | 3/2013 |
| CN | 103017007 A | 4/2013 |
| CN | 103672537 A | 3/2014 |
| JP | 2013214378 A | 10/2013 |

* cited by examiner

LED LIGHTBAR AND BACKLIGHT UNIT

BACKGROUND

1. Field of the Disclosure

The present disclosure relates to the field of liquid crystal display panels, and more particularly, to a light-emitting diode (LED) lightbar and a backlight unit.

2. Description of Related Art

A hotspot phenomenon in a backlight unit of a liquid crystal display panel should be prevented. The hotspot phenomenon is bright spots obviously distributed at intervals at sides of LED lightbars of the backlight unit. Confined to the lighting angle of 120 degrees (120°) and uneven distribution of the brightness, the brightness of a gap zone of the LED lamps is much less than the brightness of an emitting surface of the LED lamps when the LED lamps distributed at intervals on a flexible print circuit (FPC) are lit, resulting in bright and dark spots at one side of the LED lamps near a light guide plate (LGP). This is the cause of the occurrence of the hotspot phenomenon.

With the development of the LED technique, a dual-chip LED is proposed. Two lighting chips are packaged in an LED. Compared with a standard single-chip LED with the width of 3.8 millimeters (3.8 mm), the brightness of the dual-chip LED increases 1.8 times and the width of the dual-chip LED merely prolongs 0.4 mm. The number of the LED lamps of an LED lightbar can decrease with the dual-chip LED as a light source while the brightness is greater. Obviously, high brightness and high lighting efficiency are tendencies in the future. However, a problem occurs after the dual-chip LED is applied. The distance between any two LEDs enlarges in the same size when the dual-chip LED or an LED with high lighting efficiency is used. The decrease in the number of the LED lamps in the same size implies that the distance between any two LEDs enlarges. In addition, the improvement of the brightness of the LED enlarges the contrast of the bright and dark zones. As a result, the hotspot phenomenon may occur abruptly.

SUMMARY

In light of the inadequacy of related art, an object of the present disclosure is to propose an LED lightbar and a backlight unit to curb the hotspot phenomenon.

According to one aspect of the present disclosure, a light-emitting diode (LED) lightbar includes a flexible print circuit, a plurality of LEDs arranged on the flexible print circuit, and a light guiding film arranged on the flexible print circuit. The light guiding film is arranged on two adjacent LEDs. The light guiding film includes an incident surface and an emitting surface. Two sides of the incident surface of the light guiding film are attached to emitting surfaces of the two adjacent LEDs.

Furthermore, the light guiding film is arranged on the emitting surface of one side of the two adjacent LEDs adjacent to the flexible print circuit.

Furthermore, a light guiding dot is only arranged on the incident surface. The light guiding dot is configured to lead light out.

Furthermore, a prism structure is only arranged on the emitting surface. The prism structure is configured to condense light.

Furthermore, the prism structure is defined by consecutive V-shaped grooves connected with one another.

Furthermore, the light guiding dot is formed by spherical recesses arranged in an array.

Furthermore, the light guiding dot is formed by hemispherical recesses arranged in an array.

Furthermore, the light guiding dot is arranged on a gap between the two adjacent LEDs on the incident surface, and the gap corresponds to the incident surface.

Furthermore, the prism structure is arranged on the gap between the two adjacent LEDs on the emitting surface, and the gap corresponds to the emitting surface.

According to another aspect of the present disclosure, a backlight unit includes a middle frame, a light guide plate arranged in the middle frame, a light-emitting diode (LED) lightbar. The LED lightbar comprises a flexible print circuit and a plurality of LEDs arranged on the flexible print circuit. The light guiding film is arranged on two adjacent LEDs. The light guiding film includes an incident surface and an emitting surface. Two sides of the incident surface of the light guiding film are attached to the two adjacent LEDs. The emitting surface of the light guiding film is adhered to a side of the light guide plate.

Compared with the related art, a light guiding film is arranged on emitting surfaces of any two neighboring LEDs in the present disclosure. Light beams emitted by the LEDs enter the light guiding film partially. The light guiding film reflects the partial light beams are transferred to the gap between the LEDs. Therefore, the hotspot phenomenon is well curbed.

DETAILED DESCRIPTION OF THE EMBODIMENTS

The invention is described below in detail with reference to the accompanying drawings.

Figure 1:
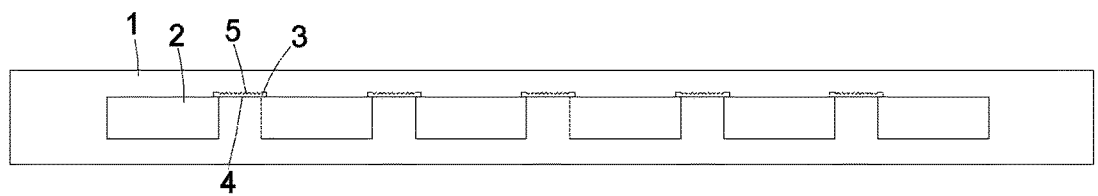
FIG. 1 illustrates an LED lightbar according to an embodiment of the present disclosure.

As FIG. 1 illustrates, a light-emitting diode (LED) lightbar includes a flexible print circuit (FPC) 1 and an LED 2 arranged on the FPC 1. The method of connecting the FPC 1 and the LED 2 in the present embodiment is the same as the method of connecting of the LED 2 and the FPC 1 of related art so the method will not be detailed. The LED 2 in the present embodiment may be a single-chip LED lamp or a dual-chip LED lamp, which is not confined by the present embodiment. The present embodiment, an improvement of the related art, is introduced as follows: The LED lightbar further includes a light guiding film 3. The light guiding film 3 is arranged on an emitting surface of any one of the adjacent LEDs 2. The light guiding film 3 is configured to reflect the light beam emitted from the emitting surface of the LED 2 and emit the light beam out of the gap between the adjacent LEDs 2 at last. Therefore, the hotspot phenomenon is curbed.

Figure 4:
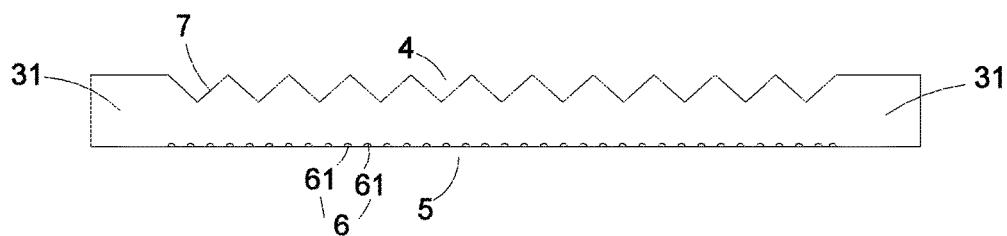
FIG. 4 illustrates a cross-sectional view of a light guiding film according to an embodiment of the present disclosure.

As FIG. 4 illustrates, the light guiding film 3 includes one or more an incident surface 4 and an emitting surface 5. Two sides of the incident surface 4 are attached to the edge of the emitting surfaces of the two LEDs 2. The incident surface 4 and the LEDs 2 are arranged correspondingly. The light guiding film 3 and the LEDs 2 may be firmly attached with a double-sided tape like the connection method of related art. The present disclosure does not propose any specific limitations to the connection method.

The incident surface 4 is formed by the surface of one side of the light guiding film 3. The emitting surface 5 is formed by the surface of the other side of the light guiding film 3, and this side is opposite to the incident surface 4. The incident surface 4 and the emitting surface 5 are arranged opposite. Specifically, the width of the light guiding film 3 is equal to the thickness of the LED 2.

As FIG. 1 illustrates, a light guiding film 3 is arranged on an emitting surface of one side of two light-emitting diodes (LEDs) 2 adjacent to a flexible print circuit (FPC) 1 in another embodiment of the present disclosure.

Figure 2:
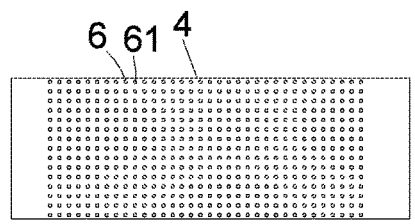
FIG. 2 illustrates a structure of an incident surface of a light guiding film according to an embodiment of the present disclosure.

As FIG. 2 and FIG. 4 illustrate, a plurality of light guiding dots 6 are arranged on the incident surface 4. The light guiding dot 6 is configured to lead light out. The light guiding dot 6 are formed by spherical recesses 61 arranged in an array. The adjacent recesses 61 are equally spaced with each other. Specifically, the light guiding dots 6 are formed by hemispherical recesses 61 arranged in an array.

Figure 3:
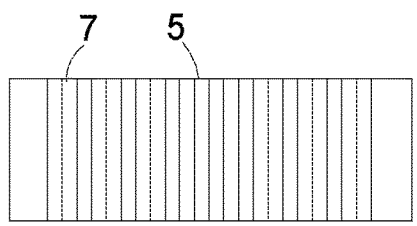
FIG. 3 illustrates a structure of an emitting surface of a light guiding film according to an embodiment of the present disclosure.

As FIG. 3 and FIG. 4 illustrate, a prism structure is arranged on the emitting surface, and the prism structure configured to condense light. The prism structure is defined by consecutive V-shaped grooves 7 connected with one another. After the V-shaped grooves 7 are connected, a bump is defined between any two of the adjacent V-shaped grooves 7. The cross section of the bump is a triangle. The prism structure and the light guiding dot 6 are arranged opposite. The number of the V-shaped grooves 7 is determined according to a practical demand, which is not confined by the present disclosure.

In another embodiment of the present disclosure, as FIG. 1 illustrates, a light guiding dot 6 is arranged a gap between two adjacent light-emitting diodes (LEDs) 2 on an incident surface 4, and the gap corresponds to the incident surface 4. A prism structure is arranged on a gap between two adjacent LEDs 2 on an emitting surface 5, and the gap corresponds to the emitting surface 5. Two terminals of a light guiding film 3 forms a connection arm 31. The connection arm 31 is firmly attached to the edge of the emitting surface 5 of the two adjacent LEDs 2.

Figure 5:
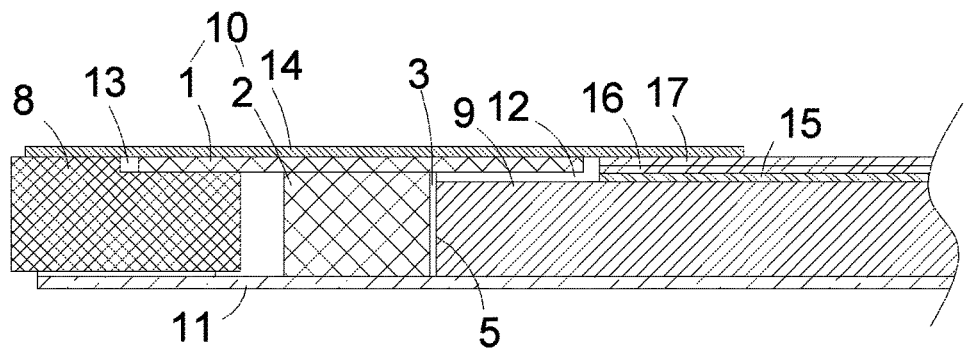
FIG. 5 illustrates a LED lightbar connecting to a backlight unit according to an embodiment of the present disclosure.

As FIG. 5 illustrates, the present disclosure further proposes a backlight unit. The backlight unit includes a middle frame 8, a light guide plate (LGP) 9 arranged in the middle frame 8, and a light-emitting diode (LED) lightbar 10 as mentioned above. The backlight unit further includes a reflector 11 arranged at one side of a liquid crystal panel away from the middle frame 8. The reflector 11 is fixed to the middle frame 8 with a double-sided tape. An optical film set is arranged at one side of the LGP 9, and the side is opposite to the liquid crystal panel. The LGP 9 includes an incident surface and an emitting surface. The incident surface is defined by the edge of one side of the LGP 9, and this side is opposite to the middle frame 8. The emitting surface is defined by the surface of one side of the LGP 9, and this side is opposite to the optical film set. The LED lightbar 10 is arranged between the middle frame 8 and the LGP 9. The LED 2 of the LED lightbar 10 and the reflector 11 are arranged opposite so three emitting surfaces of the LED 2 and the reflector 11, the incident surface of the LGP 9, the middle frame are arranged opposite, correspondingly. An accommodation sector 12 is defined at the edge of one side of the LED 2 between the LGP 9 and the optical film set. A placement platform 13 is arranged on the middle frame 8 opposite to the accommodation sector 12 (that is, the reverse side of the reflector 11 arranged on the middle frame 8). Two long sides of a flexible print circuit (FPC) 1 are arranged in the accommodation sector 12 and the placement platform 13. A shielding tape 14 is arranged on the surface of the middle frame opposite to the liquid crystal panel. The shielding tape 14 covers the surface of the middle frame 8 opposite to the liquid crystal panel, the surface of the FPC 1 opposite to the liquid crystal panel, and the edge of the surface the optical film set opposite to the liquid crystal panel. The FPC 1 is fixed on the shielding tape 14. An emitting surface 5 of a light guiding film 3 and the LGP 9 are arranged opposite. The optical film set may include a diffuser 15, a lower prism film 16, and an upper prism film 17. The diffuser 15, the lower prism film 16, and the upper prism film 17 are arranged successively.

Specifically, the emitting surface 5 of the light guiding film 3 is adhered to the incident surface of the LGP 9.

A light guiding film 3 is fabricated from polycarbonate (PC) material or polymethylmethacrylate (PMMA) material in another embodiment of the present disclosure.

The operating principle of the present disclosure is elaborated as follows.

When the LED lightbar works, the light beams emitted from the emitting surface of the LED 2 opposite to the light guiding film 3 enter the LGP 9 partially. The light beams are totally reflected and transmitted in the LGP 9. After the light beams shine on each of the recesses 61, the reflected light diffuses every nook and cranny. The reflected light emits from the emitting surface 5 of the light guiding film 3 by the reflection qualification of the reflected light is destroyed. The destroyed reflected light is condensed and emitted out through the prism structure. Since some of the light is transformed to be emitted out from the gap between the LEDs 2, the hotspot phenomenon is effectively curbed.

The structure of the LED 2 is improved without changing the original structure of the backlight unit to curb the hotspot phenomenon.

Above are embodiments of the present invention, which does not limit the scope of the present invention. Any modifications, equivalent replacements or improvements within the spirit and principles of the embodiment described above should be covered by the protected scope of the invention.

What is claimed is:

1. A light-emitting diode (LED) lightbar, comprising: a flexible print circuit, a plurality of LEDs arranged on the flexible print circuit, and a light guiding film arranged on the flexible print circuit, wherein the light guiding film is arranged on two adjacent LEDs; the light guiding film comprises an incident surface and an emitting surface; two sides of the incident surface of the light guiding film are attached to emitting surfaces of the two adjacent LEDs;

wherein a light guiding dot is only arranged on the incident surface corresponding to a gap between the two adjacent LEDs; the light guiding dot is configured to lead light out; and wherein a prism structure is only arranged on the emitting surface corresponding to the gap between the two adjacent LEDs; the prism structure is configured to condense light.

2. The LED lightbar of claim 1, wherein the light guiding film is arranged on the emitting surfaces of one side of the two adjacent LEDs adjacent to the flexible print circuit.

3. The LED lightbar of claim 1, wherein the prism structure is defined by consecutive V-shaped grooves connected with one another.

4. The LED lightbar of claim 1, wherein the light guiding dot is formed by spherical recesses arranged in an array.

5. The LED lightbar of claim 4, wherein the light guiding dot is formed by hemispherical recesses arranged in an array.

6. A backlight unit, comprising: a middle frame, a light guide plate arranged in the middle frame, a light-emitting diode (LED) lightbar, wherein the LED lightbar comprises a flexible print circuit and a plurality of LEDs arranged on the flexible print circuit; a light guiding film is arranged on two adjacent LEDs; the light guiding film comprises an incident surface and an emitting surface; two sides of the incident surface of the light guiding film are attached to emitting surfaces of the two adjacent LEDs; the emitting surface of the light guiding film is adhered to a side of the light guide plate;

wherein a light guiding dot is only arranged on the incident surface corresponding to a gap between the two adjacent LEDs; the light guiding dot is configured to lead light out; and wherein a prism structure is only arranged on the emitting surface corresponding to the gap between the two adjacent LEDs; the prism structure is configured to condense light.

7. The backlight unit of claim 6, wherein the light guiding film is arranged on the emitting surfaces of one side of the two adjacent LEDs adjacent to the flexible print circuit.

8. The backlight unit of claim 6, wherein the prism structure is defined by consecutive V-shaped grooves connected with one another.

9. The backlight unit of claim 6, wherein the light guiding dot is formed by spherical recesses arranged in an array.

10. The backlight unit of claim 9, wherein the light guiding dot is formed by hemispherical recesses arranged in an array.

* * * * *